United States Patent [19]

Schneider et al.

[11] 4,105,875
[45] Aug. 8, 1978

[54] ELECTRONIC TELEPHONE SWITCHING SYSTEM COMPRISING A SPEECH-PATH SWITCHING MATRIX AND TONE-CONNECTING MATRIX AND EMPLOYING ELECTRONIC CROSSPOINT SWITCHING DEVICES

[75] Inventors: Carl Michael Schneider, Cinnaminson; Frederick William Schimmel, Gibbsboro; John Francis Farrell, Mt. Laurel, all of N.J.

[73] Assignee: Siemens Aktiengesellschaft, Berlin & Munich, Germany

[21] Appl. No.: 773,314

[22] Filed: Mar. 1, 1977

[51] Int. Cl.² ............................................. H04Q 3/52
[52] U.S. Cl. ........................ 179/18 GF; 179/18 AD; 179/27 CA
[58] Field of Search ........ 179/18 AD, 18 FG, 18 ES, 179/18 FF, 18 GF, 18 E, 18 EA, 18 EB, 27 CA, 37, 99

Primary Examiner—Thomas A. Robinson
Attorney, Agent, or Firm—Hill, Gross, Simpson, Van Santen, Steadman, Chiara & Simpson

[57] ABSTRACT

An electronic telephone switching system is described having peripheral units including a plurality of subscriber and line circuit, a plurality of trunk and tie line circuits, at least one attendant line circuit, a plurality of signaling tone receivers, and a plurality of link control circuits. Switching is carried out by a one wire speech path switching matrix and a one wire tone switching matrix. The system is centrally controlled and includes a central processing unit, a program memory, a scratch pad memory and a customer memory. Information, commands and addresses are communicated between the peripheral units and the central control and within the central control via bus lines. The bus lines between the peripheral units and the central control transmit data with lower rise time pulses than the bus lines interconnecting the components of the central control. Each electronic crosspoint switch has a two terminal conducting path and a control terminal for controlling the state of conduction of the conducting path. Different conducting path terminals of the speech path matrix and tone path matrix crosspoint switches are operated by the same peripheral link unit. The matrix coordinates to be operated are defined by polling the different peripheral units connected to the coordinates in question.

4 Claims, 13 Drawing Figures

ELECTRONIC TELEPHONE SWITCHING SYSTEM COMPRISING A SPEECH-PATH SWITCHING MATRIX AND TONE-CONNECTING MATRIX AND EMPLOYING ELECTRONIC CROSSPOINT SWITCHING DEVICES

CROSS REFERENCE TO RELATED APPLICATIONS

This application is related to other applications filed on even date herewith, Ser. Nos. 773,309; 773,310; 773,311; 773,313; 773,315; and 773,318.

BACKGROUND OF THE INVENTION

The invention relates to an electronic telephone switching system having peripheral units such as a plurality of subscriber and line circuits, a plurality of trunk and tie line circuits, at least one attendant line circuits, a plurality of signaling tone receivers, and a plurality of link control circuits. The system includes a one wire switching speech path matrix, a one wire switching tone matrix, and a system clock unit, including a common control comprising a program memory, a scratch pad memory, a customer memory and a central processing unit and further including, as well, incoming and outgoing information and commands as addresses between the different units of the common control unit and the different peripheral units information carrying bus lines, whereby said bus lines for changing of information in the common control carry information with faster rise time pulses than the peripheral units with the common control unit, wherefore a peripheral interface logic divides the faster bus lines from the slower peripheral bus lines.

U.S. Pat. Nos. 3,904,831 and 3,943,297 describe a private automatic branch exchange (PABX) wherein subscriber line circuits signaling receivers, signaling transmitters and connecting sets of attendant stations or consoles and other special junctors are connected as input and output units to the horizontal lines of a switching matrix. Feeding sets, internal junctors or internal feeding sets, as the case may be, are connected to the vertical lines of the switching matrix. A connection between subscriber stations connected to the rows and other input and output units is established by operating the crosspoints at two matrix crossings. As an example, the connection of a subscriber station to a junctor circuit is established by closing the crosspoint switch at only one crosspoint of the switching matrix. The number of crosspoints is dependent on the number of wires to be switched.

Techniques for establishing connections between input/output (I/O) devices connected to the horizontal lines of the switching matrix by using a switching matrix having one or more stages and by through-connecting more than one crosspoint are exemplified by U.S. Pat. No. 3,308,242 and British Pat. No. 1,058,893. The latter shows that this form of connection may also be established by wires of a single switching stage of the switchng matrix, each of which connects at least two crosspoints. In this regard, reference is made to the article, "Le nouveau system telephonique Trachsel-Gfeller a reflecteurs crossbars" in the Swiss publication TECHNIQUE PTT, 1955, No. 3, pp. 115-129, and to "Der X/53er-Schweizer Kreuzschienen Hausautomat" published in HASLERMITTEILUNGER OF HASLER AG, Bern, No. 3, 1957, pp. 57-67, as well as to U.S. Pat. No. 2,955,165. Various types of systems are employed in these known telephone systems, i.e., both directly controlled systems and those using common-control equipment.

In some of the aforementioned faciliteis, subscriber stations, as well as junctor and feeding circuits are to be scanned in successive cycles in accordance with the last-look principle. For example, it is known from U.S. Pat. Nos. 3,904,831 and 3,943,297, when a subscriber originates a call which is to be identified during the scanning cycle, after assignment of a junctor and feeding circuit, to commence the further states of operation, such as transmission of the selection signals, during the scanning cycle of the relevant junctor and feeding circuit in use. This means that the scan period of a junctor and feeding circuit must be comparatively long so as to be able to perform all the functions involved in the exchange of information between the junctor and feeding circuit and the connected calling and called peripheral units, such as subscriber stations.

The transmission of signal tones (e.g., dial tone, busy tone or ringback signal) to the peripheral units, such as subscriber stations, is also accomplished during the scan period of the junctor and feeding circuit being used for the connection in question. The appropriate tone is connected by linking the tone generator via appropriate tone crosspoints to a junctor circuit repeater. Hence, tone-connection and speech-path crosspoints are provided. This prior art arrangement is exemplified by West German Auslegeschriften No. 1,079,685 and 2,111,787.

West German Auslegeschrift No. 1,079,685 describes a method of using a central tone generator whose tone signals are connected via tone-connecting crosspoints to a subscriber station; the tone-connecting crosspoints are opened and closed in synchronism with the system clock-pulse pattern for the tone (e.g., busy tone) to be transmitted. It can also be seen from West German Patent No. 2,111,787 (VPA 71/6033, filed March 11, 1971) that the tone signal is connected via a tone connection separated from the speech path connection to a repeater winding of the junctor and feeding circuit. In this patent, it is pointed out that the control circuit for the crosspoints of the tone connection is separated from the access circuit of the tone signal. It is likewise known in the time division multiplex (TDM) switching art to connect the tone during the sampling period for the junctor and feeding circuit.

The principal disadvantages of the known arrangements, such as those described in U.S. Pat. Nos. 3,904,831 and 3,943,297, are as follows:

a. Greater complexity as a result of the two-wire switching in the switching network, particularly with regard to switching control, and supervisory means as well as greater complexity of I/O units and junctor and feeding circuits.

b. Since each sampling of peripheral units occurs only during the normal periodic sequence of the scanning cycle, either the quantity of information to be exchanged during each scan or the number of I/O devices that can be connected, as well as of the junctor and feeding circuits, is considerably reduced because of the long period required for scanning these circuits.

c. Considerable technical effort is needed to permit the exchange of information, via the junctor and feeding circuits, with the units connected thereto while they are being scanned.

d. This is all the more difficult, since access is possible only via the switching matrix by scanning the horizontal lines of the switching matrix.

e. Since tone connection via the tone switching matrix is likewise a function of the scan period of the junctor and feeding circuits, this means an additional load for the outlay required for establishing the connection during the scan period of a junctor and feeding circuit.

It is an object of this invention to provide means using a minimum quantity of equipment and using the existing centralized switching elements and known data transmission means, as well as a known switching network for speech-path switching, for controlling the tone connection via an appropriate tone-connecting matrix, analogous to speech-path switching, by interrogating in such a manner that the tone is connected and removed in a simple manner along the speech path being used.

SUMMARY OF THE INVENTION

In the electronic telephone switching system under consideration, the above and other objects are achieved in that the speech path switching matrix and the one wire tone switching matrix use electronic crosspoint switching devices, each having a two terminal conducting path and a control terminal for controlling the conductivity of the conducting path. The connections between each terminal of the conducting path are, respectively, disposed in row and column coordinates of the matrix. One conducting path terminal and the control terminal of a speech matrix crosspoint switch and a corresponding other conducting path terminal of the tone matrix will be connected to the same peripheral link control unit. The exchange of information and commands over the bus lines to define both coordinates of a crosspoint in the matrix is done by interrogating the different units, which are connected to the relevant coordinates of said crosspoints at different time periods.

Thus, both the crosspoints of the speech-path network and those of the tone matrix can be interrogated by the common control unit. In this way the tone can be connected and removed by interrogating at a given rate. Thus extensive use of the common-control unit in determining the digit period and digit interval is assured. The row connected conducting path terminals of the tone matrix can be spatially placed in a "90° shifted relationship" relative to the column connected corresponding conducting path terminals of the speech path matrix. Thus, there is assurance that only one tone signal at a time can be connected to a through-connected speech path.

According to a further development of the invention, the different time periods for the scanning and polling are time periods in the same or in different time periods in a scan cycle, whereby the central processing unit controls this operation so, that at first the scanning and then the polling will be done in the same time period of the scan cycle.

In this way there is assurance that no great delay can occur in the control sequence so that connecting and removal times can differ no more than 10.5 ms from the given value.

According to a further development of the invention, the attendant line, except for the speech path connection circuit, has a two wire sending and a two wire receiving connection to the attendant station, and each receiving end of both two wire connections includes in the loop circuit a photo coupler for the controlling of the interpretation circuit. By means of both two wire connections all information, addresses and the like will be sent by series-code signals.

In this way almost any number of function designators in both directions of transmission and designators for controlling signals at the attendant station can be exceeded. Moreover, the number and type of designators to be transmitted can be varied at will without modifying the number of connecting wires between connecting circuit and attendant station.

According to a further development of the invention, the system's program memory and central processing unit are used for defining the transmission frequency of the tone signals to control the closing and releasing of the tone matrix crosspoint switches. The program memory and central processor are connected by bus lines to transmit information for these functions to the tone generators and link control units.

Further, the program memory for establishing the tone frequency will be connected via bus lines to a customer control device for changing tone frequency.

This permits at any time the simple adaptation of the tone frequency to the particular requirements without modifying the system.

BRIEF DESCRIPTION OF DRAWINGS

The principles of the invention are described hereinbelow with reference to the following description of a preferred embodiment given in conjunction with the drawings which are briefly described as follows.

DETAILED DESCRIPTION OF A PREFERRED EMBODIMENT

Figure 1:
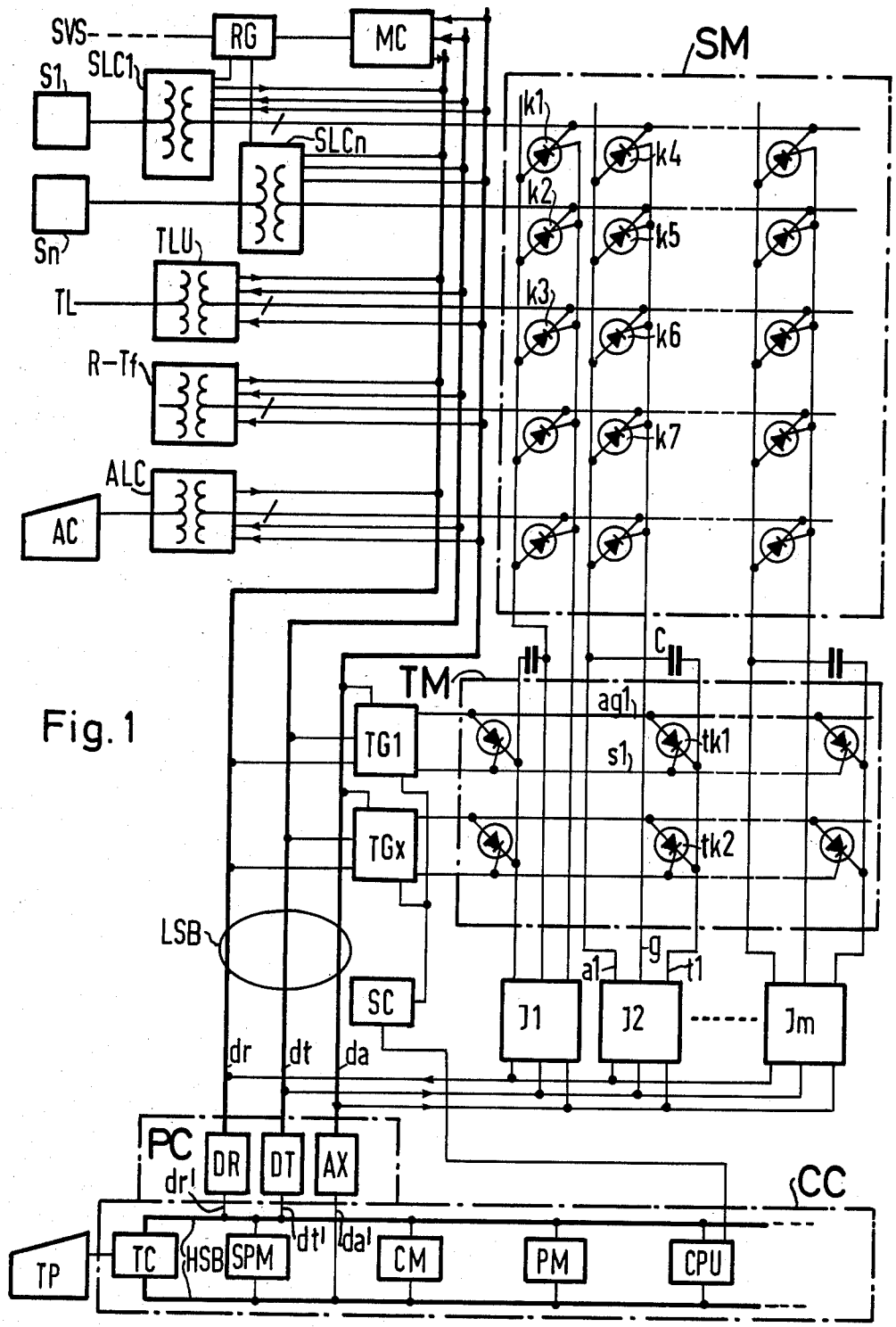
FIG. 1 is a schematic block diagram of a PABX system in which the switching arrangement of the invention is utilized.

The invention will now be described with reference to a preferred embodiment of a program-controlled PABX which is to be assembled from conventional electronic components generally employed in data processing systems and in particular in centrally controlled telecommunications switching systems. However, certain of these commercially available components must be modified for use and assembly into the inventive PABX, and where necessary the components are described in detail hereinbelow.

System Description

The PABX described hereinbelow and illustrated in FIG. 1 operates according to the principles of a system wherein the subscriber line circuits (SLC1 to SLCn), the tie line circuits, interexchange trunk repeaters and interoffice trunk repeaters such as trunk line circuits TLU, tone-frequency signal receivers R-Tf and connecting circuits ALC of an attendant's station AC are scanned in a periodic sequence so as to determine, on the basis of the last-look principle, if the last operating condition has changed. The last-mentioned four types of circuits or repeaters, as the case may be, and link control circuits J1 to Jm, tone generators TG1 to TGx, and the logic control unit for service SVS are likewise interrogated during idle periods, i.e., during time intervals between two scan periods per address code. This is necessary in order to receive data or transmit instructions to any one of the seven types of circuits mentioned hereinabove.

It is obvious that the one-at-a-time principle always applies to the reception and transmission of data and instructions and to the scanning of circuits. The circuit to be scanned is selected by a data processing unit CPU on the basis of a a conventional program stored in program memory PM, which is a constituent part of the central program control CC. In one scan period all peripheral units and other scan devices are scanned one after another. These scan periods are so chosen that there are free times after each period. In these free times of each period in a scan cycle each of the peripheral units and also memory spaces will be controlled by sending the address of that unit or space via the data bus line, e.g., da; this is called "polling" a unit or line or memory space.

If more idle time exists in scanning period as needed, particularly during light-traffic periods, these idle times can be used for performing service and test procedures. This is discussed in greater detail hereinbelow.

Switching network SM of the system may consist of one or more stages. In the present example, it is assumed that the switching network for switching the speech paths to the subscriber line circuits, the interexchange trunk repeaters and the attendant's station as well as to the tone-frequency receivers is single-stage. This means that two crosspoints in a column must be operated in the known manner to connect two subscriber stations together or one subscriber to one interexchange trunk repeater. In the system under consideration, the switching network for switching the speech path and the speech path itself have one wire. Thyristors are employed as crosspoint switching elements. These thyristor crosspoint elements are operated in the call condition during the scan periods of the subscriber stations or of the holding circuits, whereby the latter are not scanned in a periodic sequence, but polled.

The crosspoint switches are switched on and off by polling by the crosspoint switch used for connecting a subscriber line circuit to a holding circuit via bus line LSB/dt. The switching elements used in the system and the control principle as well as the various basic functions will be described hereinbelow.

The central control unit CC of the system comprises a central data processing unit CPU of conventional construction which controls all necessary process in the system, particularly those for scanning and polling the peripheral units with a view to receiving data and the processing thereof as well as the dispatch and transmission of instructions.

To handle these processes, the central data processing unit CPU is provided with a scratch pad memory SPM with variable content. This means that this scratch pad memory SPM is always kept current on the last status of the data with regard to the existing conditions of the subscriber line circuits, line repeaters, crosspoints, etc. Furthermore, the central data processing unit CPU is provided with a program memory PM, in which the provided programs are stored, and with a customer memory CM, which at least contains the specific data for the subscribers, various repeaters and other peripheral units and circuits. If necessary, this memory CM may be polled by the central data processing unit CPU. The customer data memory CM is variable, i.e., the data for subscribers to be stored and other peripheral units and circuits are input by the maintenance man through selection via a peripheral maintenance circuit MC. These are known circuits and not relevant to this invention so that they are not described in detail herein.

The transmission of data and instructions as well as addresses to or from the central data processing unit CPU, program memory PM, customer data storage CM, scratch pad memory SPM and test circuit TC can be accomplished in the bus lines HSB which carry faster rise time pulses. The interrogation of the centralized units and decentralized circuits is effected via the faster bus lines for addresses HSB/da'. The speed of the data transmitting on both kinds of bus lines is equal. The faster rise time pulses have a faster rise time of the leading edge because, in the input circuits of the HSB bus line, TTL components are used. In the LSB bus lines MOS components are used; therefore, we have in this case lower rise time pulses. The advantage is that in this case the needed performance is lower as are the reflections if they are long connecting lines.

With regard to the transmission of data and addresses or the reception of data from the peripheral and other units, it must be stated that these operations are done by lower rise time pulses as in the central control unit CC. Hence, the peripheral conversion and storage device PC is provided, which establishes the connection between the faster rise time pulses transmission circuit HSB and the lower rise time pulses transmitting bus lines LSB. The construction and operation of these bus lines, units and circuits are described in detail hereinbelow:

Dial Pulsing and Voice-Frequency Code Dialing

The PABX system described hereinabove employs telephones with decimal pulsing, as well as those using voice-frequency code dialing. To be able to distinguish the subscriber stations using different modes of dialing from each other, those stations are identified with a special bit code in the customer memory CM.

The subscriber stations using pushbutton dialing all have a tone signal generator so as to be able to send voice-frequency dial signals. In the present example each number dialed consists of two out of seven or eight frequencies. In each case, regardless of whether dial pulsing or voice-frequency dialing is provided, the first digit of a cord dialed is passed to central data processing unit CPU, which can compare this digit information with the data stored in the customer memory CM so as to find out what type of signal is needed to extend the call to the wanted telephone or interexchange trunk.

Conventional AND/OR elements are employed as comparator and evaluator circuits. If the interexchange trunk repeater gives access to a system based on dial pulsing, the selected digit must be converted. This occurs in the occupied interexchange trunk repeater. In the case of internal calls, no conversion takes place, but the coded signals dispatched from the subscriber station are passed as voice-frequency signals directly from the tone generator of the subscriber station via the speech path and the appropriately operated crosspoints of the speech path network to the voice-frequency signaling receiver R-Tf and the central control unit. The transmission is accomplished in an appropriate signal code of the central data processing unit CPU of the central control unit CC via the data bus lines LSB/dr if information for the marking of the crosspoint is complete.

As mentioned earlier, if necessary the two frequencies supplied from a subscriber station using voice-frequency dialing are converted in the interexchange trunk repeater occupied, but firstly the first code digit will be converted in the voice-frequency signaling receiver R-Tf and then passed to central data processing unit CPU for evaluation purposes, then for an external connection the trunk repeater will be seized. The latter retransmits the further dialed information via the corresponding interexchange trunk line. If necessary, the voice-frequency signals are converted in the interexchange trunk repeater, e.g., into decimal pulsing signals, which are passed on via the speech wires in the known manner. These pulses are rerouted in the system frequency, i.e., as a function of the system timing device.

This type of conversion of two-frequency signals into decimal dial pulses is effected in a manner as is known for telephone systems with both types of dialing options.

Program Control Unit PM, Data Processing Unit CPU, Scanning, Polling

The following description illustrates the instructions defined in a program for execution by the central processing unit CPU. These instructions control all functions in the peripheral switching units. The peripheral switching units include, for instance, the subscriber line circuits SLC1 to SLCn, the interexchange trunk repeaters TLU, the voice-frequency signal receivers R-Tf, connecting circuit ALC for attendant's station AC, as well as the tone generators or tone converters TG1 to TGx and the crosspoints of switching network SM and the associated link control circuits J1 to J(m) provided in each column. A specific program listing is not given herein, but it can be readily derived from the functions and operating sequences described hereinbelow.

As mentioned hereinabove, the central processing unit CPU transmits a number of signals to the peripheral units such as specific clock signals, intermediate information, addresses and class-of-service signals. All these types of data are available in the semipermanent memory SPM and customer data memory CM. The central data processing unit CPU receives, at a rate of 80 times a second, the status of each subscriber station (e.g., S1), of each interexchange trunk repeater (e.g., TLU), of each voice-frequency signal receiver R-Tf and of each connecting circuit ALC of an attendant's station AC. This means that each unit is scanned 80 times a second, i.e., about once every 12.5 milliseconds, so that, after data transmission, the rest of the 12.5 milliseconds can be used for other functions as are described hereinbelow.

When the status of one of the above mentioned peripheral units and circuits has changed in relation to the last status ("last look"), this information is received in the working storage together with the address of the peripheral unit or circuit. During the next idle period of the scanning cycle the central data processing unit CPU can be interrogated by polling the particular unit or circuit concerned to identify the data stored and dispatch the necessary instructions. Data are received from the central data processing unit CPU via the bus lines LSB/dr, LSB/dt and the peripheral conversion and memory device PC. If an excessive number of peripheral units or circuits or crosspoints, as well as holding circuits, wait for service by the central processing unit, and the free time in one period of the scanning cycle is not long enough for handling all requests stored, the rest of the processing is done in the next idle time of the first following period of the scanning cycle. The central data processing unit in such a case continues its polling operation for the unit waiting for service in a sequence defined by the program in the program memory PM. This sequence is based on a predetermined definition, using the well known criteria, of the priorities or class-of-service and type of incoming data resulting, for example, from the changes in status of a peripheral unit or circuit.

The following description demonstrates, as mentioned in the preceding paragraph, that the described PABX distinguishes between the normal scanning cycle and the polling of peripheral units and circuits whose addresses are available together with the data in working storage SPM. The central data processing unit CPU must operate on the data of the particular peripheral unit or circuit concerned in order to be able to execute instructions for the following operations, e.g., the establishment of a connection for that unit or circuit. This may be the connecting of the calling station Sn via subscriber line circuit SLCn and the speech path network SM to the interexchange truck TL for the desired route. The connection via the speech path network SM is established by operating two crosspoints in a column, e.g., k2 and k3 in FIG. 1. The speech path network SM in the PABX being described has one stage, but a greater number of stages may be used.

The polling of peripheral units and circuits by transmitting the address of this unit or circuit via the wires dt of the data bus lines LSB in the free time intervals of sequence periods in the scanning cycle is a characteristic feature of this system. The advantage of this technique lies in the fact that the entire system can be run with a single microcomputer of known construction. In the case under discussion the computer is the central data processing unit CPU, which processes the incoming data and provides the instructions. Thus, a minimum number of additional modules and circuits are required. These advantages are facilitated by insuring that the scanning and interrogation operations occur within the time pattern of the clock pulse generator SC.

Another important factor for the PABX is the single-wire speech path to be switched via the speech path network SM. This single-wire speech path is switched, preferably, by means of thyristors. Such speed path switching has many advantages for the system described and used herein, as will become apparent from the following description.

From the above it follows that the different time periods for the scanning and polling may be in either the same or in different time periods in the scan cycles. The central processing unit CPU controls these operations so that initially the scanning and then the polling will be done in the same time period of the scan cycle.

Speech-path and Tone Crosspoint Switches

As mentioned earlier, voice communcation between two subscriber stations or between one subscriber station and an interexchange trunk repeater is established by means of the switching speech path matrix SM by operating two of the crosspoint switches in a column. If, in addition, transmitted pulsing signals must be converted, a third crosspoint switch in the same column must be operated with a view to connecting an appropriate voice-frequency signaling receiver T-Rf. The same is true if, for example, the exchange operator must cut in, in which case the particular connection can be established by additional operation of the contact located in the column which has been occupied for the connection. Such interconnection of telephones, interexchange trunk repeaters, receivers and operator's positions by operating two or more crosspoints disposed in a column coordinate is known and is found, for instance, in time division multiplex systems by simultaneously closing two or more switches having the same pulse position. Such arrangements are known, as well, in older PABXs.

The technique of applying tone signals by means of a special tone signal switching matrix is exemplified in West German Pat. No. 2,111,787, as mentioned hereinabove. However, in the invention described herein a special feature of the tone connection mode lies in the particular way of connecting the tone by using single-wire switching matrices, i.e., a single-wire speech path switching matrix as well as a single-wire tone switching matrix. The special nature of this tone-signal connection to the speech path is essentially formed by the control leads for the crosspoint which is to be through-connected.

The general system description shows that the essential current rise needed for through-connecting via the crosspoints is brought about by the current sink for the speech path crosspoints in the subscriber line circuits or interexchange trunk repeaters and for the tone-connection crosspoints in the link control circuits. The through-connection is supplied from a link control circuit J1 to Jm for the speech path crosspoints as well as for the tone crosspoints. Each link control circuit is assigned to a column of the crosspoints of the speech path switching matrix and to a row of the tone signal switching matrix. However, one separate output is provided in the relevant repeater to achieve this.

The tone generators TG1 to TGx convert the square wave pulses received from the central clock-pulse generator SC into sinusoidal signals made up of one or more frequencies.

In order to through-connect the crosspoints, the subscriber line circuits, the interexchange trunk repeaters, the connecting circuit, etc. as well as the link control circuits and tone generators, are polled from the central data processing unit via the address lines during the idle times of scan cycle periods. To disable the crosspoints, new polling with an accompanying disabling instruction is necessary. This is also essential with a view to the tone-signal transmission since in this case, in addition to the tone-signal identification, one must indicate what clock pulse is involved to enable the tone to be removed in conformity with the ON time and OFF time.

FIG. 1 shows that via line $t1$, which represents the cathode line for the tone crosspoints $tk1$ and $tk2$ disposed in a column coordinate and which is polled via the link control circuit J2 (current sink) the connection of the tone to anode line $a1$ of speech path crosspoints $k4$ to $k7$, disposed in a colunn coordinate occurs via a bypass capacitor (e.g., C). If, for example, one views the connection of a tone signal from the tone generator or tone converter TG1 to the line connected to subscriber S1 via the crosspoint $k4$, this connection requires operation of the tone crosspoint $tk1$.

To achieve this, the cathode line $t1$ must be accessed from the link control circuit J2, the anode line $ag1$ from tone generator TG1, and the control electrode from the tone generator TG1 via the control wire $s1$. The accessing occurs by polling the tone generator TG1 and the holding circuit via the address lines "$da$" of the data transmitting bus line LSB and the address output unit AX of the peripheral conversion unit PC. The latter unit and, thus, the address output unit AX receives the addresses of the tone generator to be accessed and of the repeater to be accessed from working memory SPM under the control of the data processing unit CPU. The working memory SPM receives its data allocated to individual connections from the customer memory CM, in which signal-connection and delay signals for each tone generator are stored. It is there indicated which tone signal must be transmitted to which subscriber and which link control circuit is used. The activation of the crosspoint switches is effected by polling in the same manner as the corresponding transmitting of information.

The information as to which tone signal must be transmitted yields as instruction for the tone connection and the removal as a function of a central clock generator SC. This means that the tone crosspoint is closed and opened as a function of connection and removal instructions. A tone generator is assigned as a tone converter to each clock pulse.

As will be described hereinbelow, the data in the customer memory may be altered from a maintenance position via a maintenance circuit MC and bus lines LSB/HSB by keying or dialing in, so that clock pulses assigned to a tone generator, too, can be varied.

In connection with this application of the tone signal, there must be assurance that only one tone signal at a time will be applied to a specific connection. Double connections are not possible without faulty activation of crosspoints in the circuit arrangement defined herein.

Alteration of Clock Pulses for Existing Signals or Initiation of New Signals The clock pulses of the signals to be transmitted are determined by appropriate control of the tone-connection crosspoint switches, and through-connection, as well as separation of the crosspoint switches, is dependent on the polling of each crosspoint and one of the corresponding transmissions of instruction signals. The clock pulses associated with a given tone signal, e.g., calling signal, busy signal, etc. are stored in the program memory PM and are polled with each activation of a tone-connection crosspoint for the first (e.g., "ringing tone") connection during a call to be established as a function of the ringing tone connection instruction from the central data processing unit. In addition to this timing information, i.e., "calling signal" the working memory SPM will store the further call data, such as the telephone address and the tone generator address. The timing information contains data on the initiation and end of the clock pulse and on the different forms of signal, i.e., the purpose of the signal, such as ringing, for example.

In order to have the option of altering the clock pulses (preprogrammed in the system) of specified signals (e.g., ringing) as well as initiating new tone signals, the program memory PM must either be programmable in a simple manner or the timing of specified signals must be stored in the customer memory CM assigned to the tone generators instead of in the program memory and have facilities for interrogation there. In any event the customer memory CM is available as a memory that can be altered at any time, i.e., a random access memory (RAM) is used.

It should be noted that each of the tone generators is allocated according to the different frequencies and not to a specific signal (e.g., ring signal). The connection of special devices, such as tape recorders and also other data devices, may also be effected over one or more special tone generators in the speech path.

Dictating machines, television sets for conferences, data terminals, etc. can be connected with the speech and/or special matrix like the other peripheral units. The assignment of tone generators containing converters for specific clock pulses simplifies the control of the tone-signal crosspoints and will lead to savings in memory capacity. The central clock pulse generator SC is employed to synchronize the instructions dispatched from the central data processing unit CPU with the clock pulse available in the system.

Control of Crosspoint Switches in the Case of Single-Wire Switching

Figure 4:
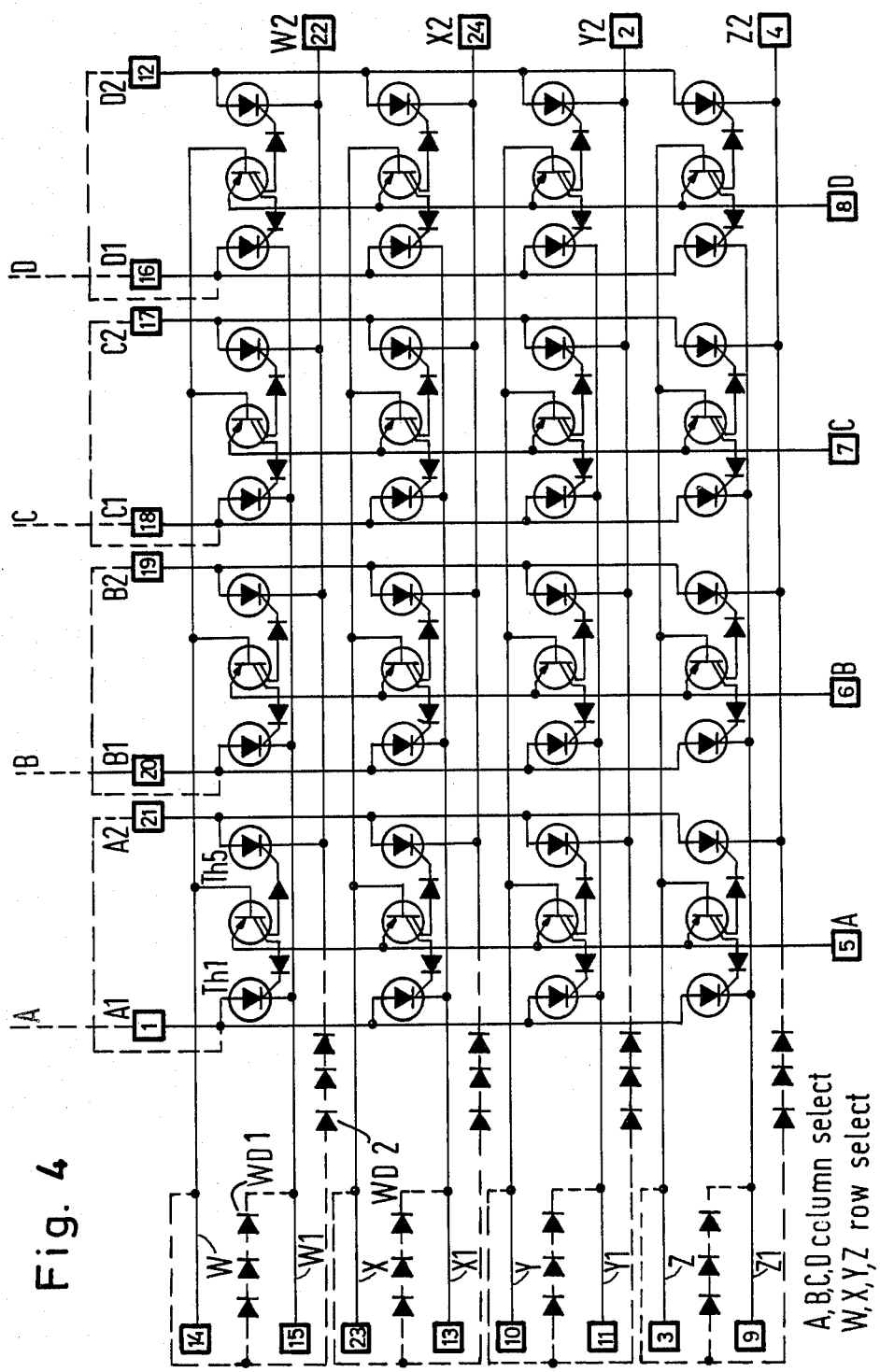
FIG. 4 is a schematic diagram illustrating an 8×4×1 switching matrix achieved through a rearrangement of the 4×4×2 matrix and by using the FIG. 3 switching modules.

Thyristors are preferably employed as crosspoint switches in the system described herein, and these are combined in a switching network to form a switching matrix in the manner to be described below. This switching matrix is a 4×4×2 crosspoint switch, i.e., a matrix having 4×4 dielectrically insulated thyristor modules disposed in 4 rows and 4 columns and with two thyristors per crosspoint. Thus, two-wire switching of speech paths is possible (FIGS. 2 and 4).

If in the described system the same switching matrix is employed for single-wire switching, it must be modified appropriately so as to activate the crosspoints, assuming the use of the same crosspoint switching devices. Thus, the switching matrix is to be modified to form an arrangement with 8 rows and 4 columns and one crosspoint switch per crosspoint, i.e., with 8×4 thyristors with one crosspoint each, or 8×4×1.

Figure 2:
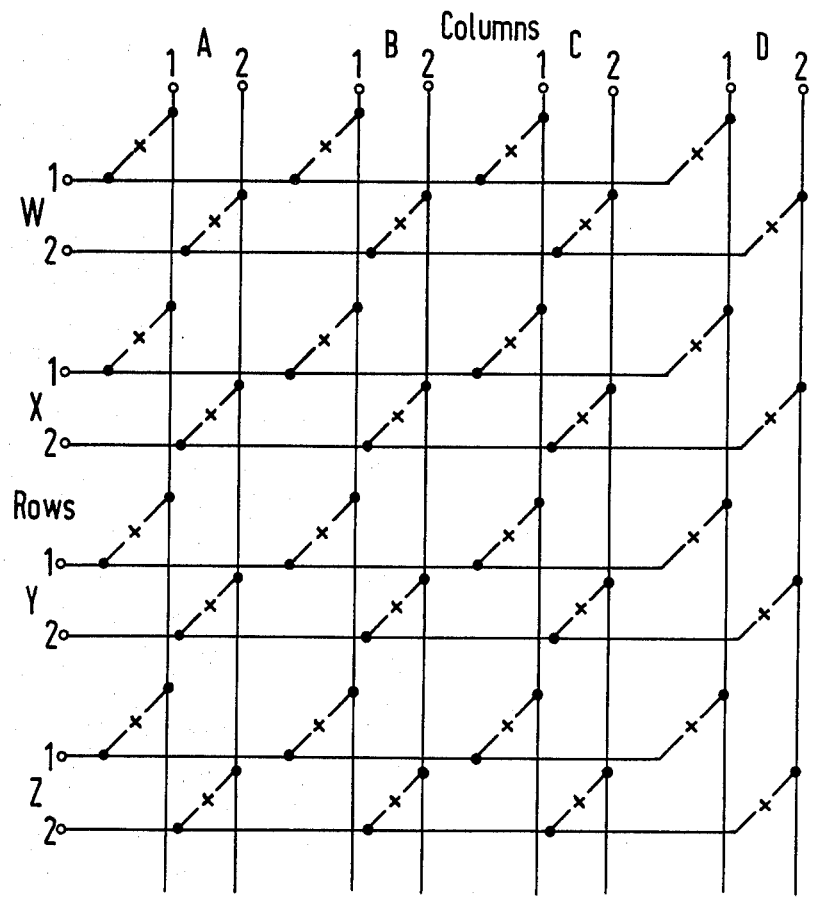
FIG. 2 is a schematic diagram of a known 4×4×2 switching matrix illustrating crosspoint switching activation in a matrix of this form.

FIG. 2 illustrates the activation of the crosspoint switches in the known 4×4×2 matrix. The column in which the crosspoints to be activated are disposed is determined over one of the two control leads 1 or 2 in columns A, B, C or D, and the row is determined over one of the control leads 1 or 2 in rows W, X, Y or Z. Both thyristors disposed at a crossing point are through-connected, not only in the presence of the corresponding control signals on the control leads for the determination of the row and column, but also only after previously turning on the appropriate cathode and anode potentials.

Figure 3:
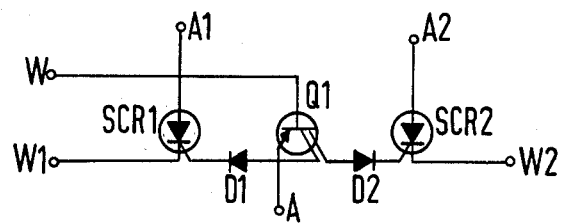
FIG. 3 is a schematic diagram of a crosspoint switching module used with the FIG. 2 switching matrix.

FIG. 3 illustrates the construction of a thyristor module forming a crosspoint switch.

In order to obtain a 8×4×1 matrix for the telephone switching system described herein, the existing 4×4×2 matrix must be rearranged. To achieve this, the thyristors through-connected via the anode A1 (FIG. 3) are followed by those disposed in a column coordinate and through-connected via the anode A2. This is shown by a dotted line in FIG. 4 between the thyristors T$h$1 and T$h$5. At the same time, and connected in parallel with the cathode inputs 15 and 22 of the thyristors T$h$1 and T$h$5, a connection to the control lead W is established via the diodes WD1 and WD2. This control lead W is intended for selecting the row in which a crosspoint is to be operated. This is to assure that only the thyristor which is determined via a cathode input (e.g., 15) and the input (e.g., W) of the control lead, as well as via the vertical control lead (e.g., A) can be activated or through-connected. To determine the relevant column, the input A, B, C or D is provided without change.

Figure 5:
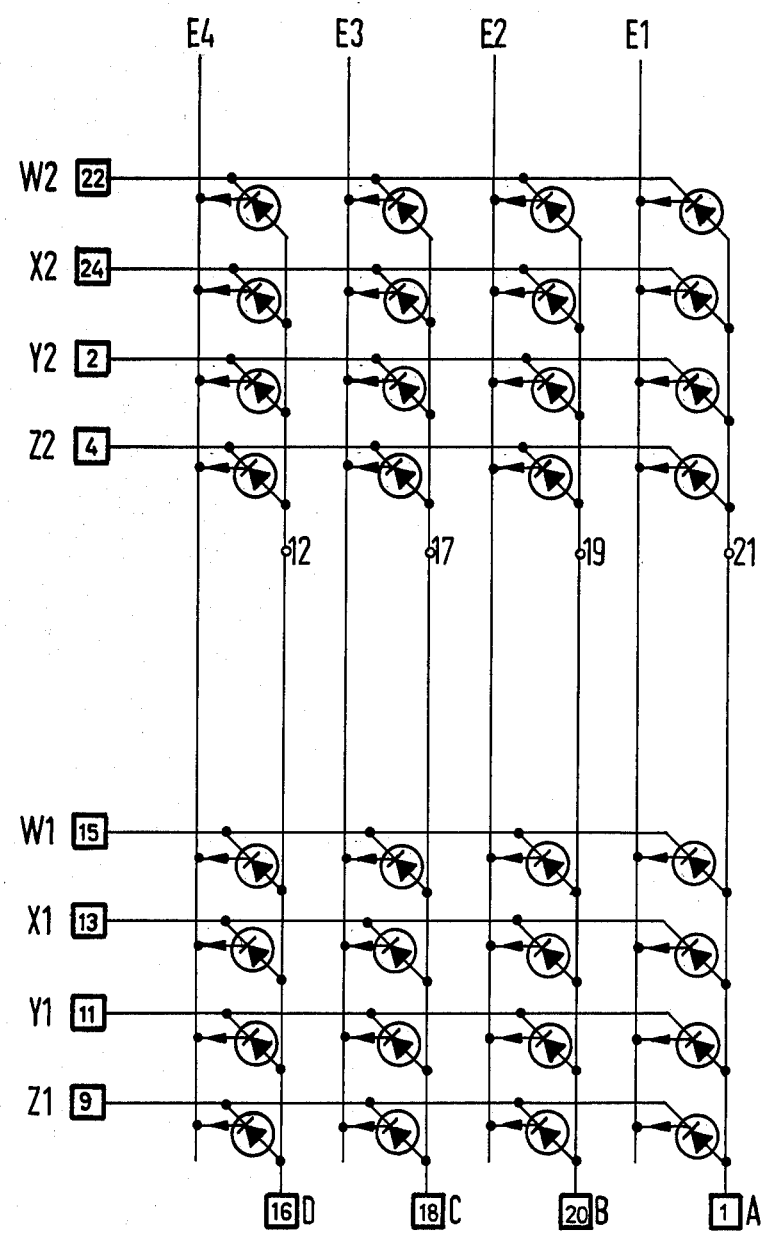
FIG. 5 is a schematic diagram of an 8×4×1 switching matrix wherein crosspoint connections are completed through separate activation of thyristors in a thyristor switching module.

FIG. 5 shows an arrangement for a switching matrix which does not require correlation between two thyristors and a thyristor module. It shows that by connecting in parallel the thyristors associated with a column, coupled with the possibility of separately activating the two thyristors associated with a given thyristor module, the existing 4×4×2 matrix can be converted into a 8×4×1 matrix.

To operate a crosspoint switch in this manner, the following processes, for example, must be executed: mark a subscriber station (e.g., S1), thereby marking the subscriber line circuit and turning on the cathode potential, e.g., across 22 (the current-sink circuit remains energized even after closing until opened by a separation instruction); determine at the same time the row, then mark a holding circuit (e.g., J2) by interrogating it and connecting a control signal (e.g., to line E1), and at the same time determine the column. In this way, each through-connection in the switching matrix occurs when the anode potential (e.g., across A1) is turned on (FIG. 1).

It is apparent from the above that the connection of the cathode lines W1, W2 via the diodes WD1, WD2 with the control lead W permits single-wire switching via the particular matrix. The diodes WD1 and WD2 prevent crosstalk.

LINK CONTROL CIRCUIT

By means of one of the link control circuits (e.g., J1 in FIG. 1) there occurs the activation of the speech-path crosspoint switches as well as the call setup from the anode line to the cathode line via a through-connected thyristor and the tone-signal connection via an additional (likewise through-connected) tone crosspoint switch and its cathode line (as shown in FIG. 1). In addition, the link control circuit facilitates an appropriate regulation of attenuation and when a speech-path crosspoint switch is operated, it signals the corresponding module.

Figure 6:
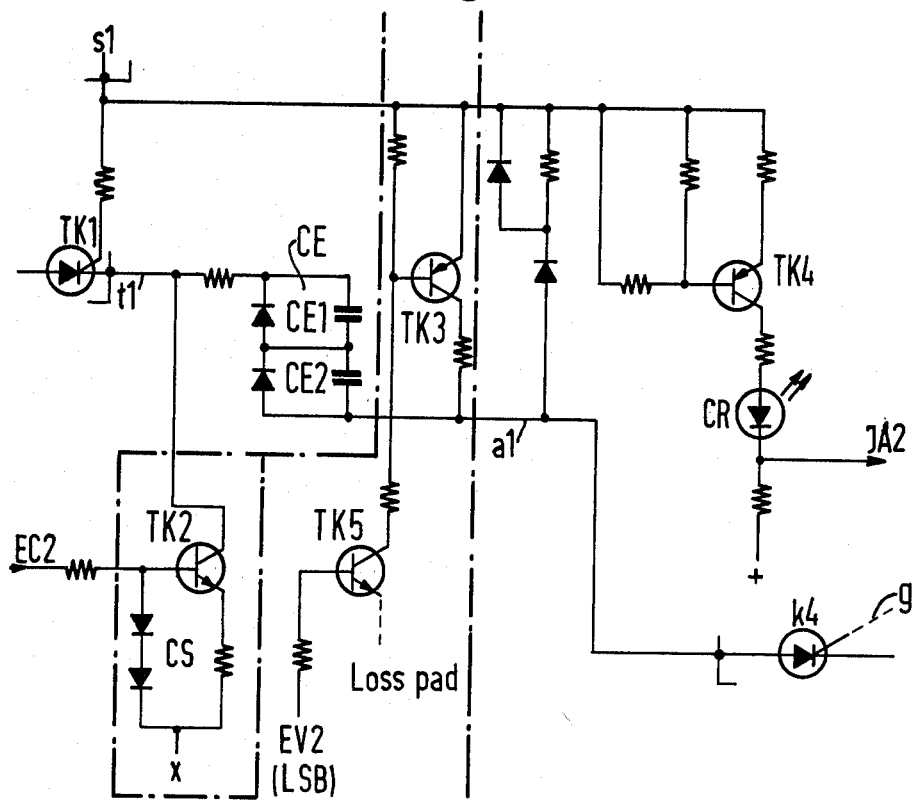
FIG. 6 is a schematic diagram illustrating the connection arrangement of wires a1, s1, and t1 (FIG. 1) to a link control circuit (e.g., J2) in the FIG. 1 embodiment.

FIG. 6 shows the scheme for connecting the wires a1, s1 and t1 to the link control circuit (e.g., J2). The current sink of the link control circuit is labeled CS. As shown, the wire t1 is connected to the base of the tone-crosspoint thyristor TK1. The control wire for the speech-path crosspoint is labeled g. The point JA2 is the scanning point for the crosspoint; that is, it is the point activated via the interexchange trunk and PBX-power-lead repeater so as to through-connect or disable the particular crosspoint concerned. In the control connection to the point JA2 there is likewise connected a photo coupler CR intended for signaling the operating condition to a module when the crosspoint is activated. A loss pad TK3/TK5 is connected to the anode line a1 of the speech path crosspoint. This pad TK3/TK5, which is or is not activated by the common control unit CC as a function of the form (i.e., short or long) of the connected interexchange trunk, is connected with anode line a1 of the speech path crosspoint. This pad is needed whenever short lines are connected. In the present instance, the attenuator circuit causes an interposition of an additional resistance of about 300 ohm.

A capacitance CE forms a connection to the anode line over which the tone signal is linked to the speech path (C in FIG. 1). It should be noted that the anode line is connected to all speech-path crosspoints disposed in a column coordinate and that in order to establish voice communication at least two such crosspoints must be operated. Hence, it follows that, depending on the number of operated crosspoints of one or more subscribers, a signal can be transmitted via the capacitor and tone-signal connecting point, for example not only to the calling or called party, but also to all parties involved in a call in progress.

It should also be noted that the activation of the loss pad occurs via the wire EV2 by interrogation via the slower bus line LSB.

As mentioned earlier, the crosspoint switch of the tone switching network is operated in synchronism with the prescribed clock pulse pattern. This is done through activation via the control wire 1 by applying appropriate connection and removal signals from the central data processing unit CPU over the data transmission circuit.

Figure 7:
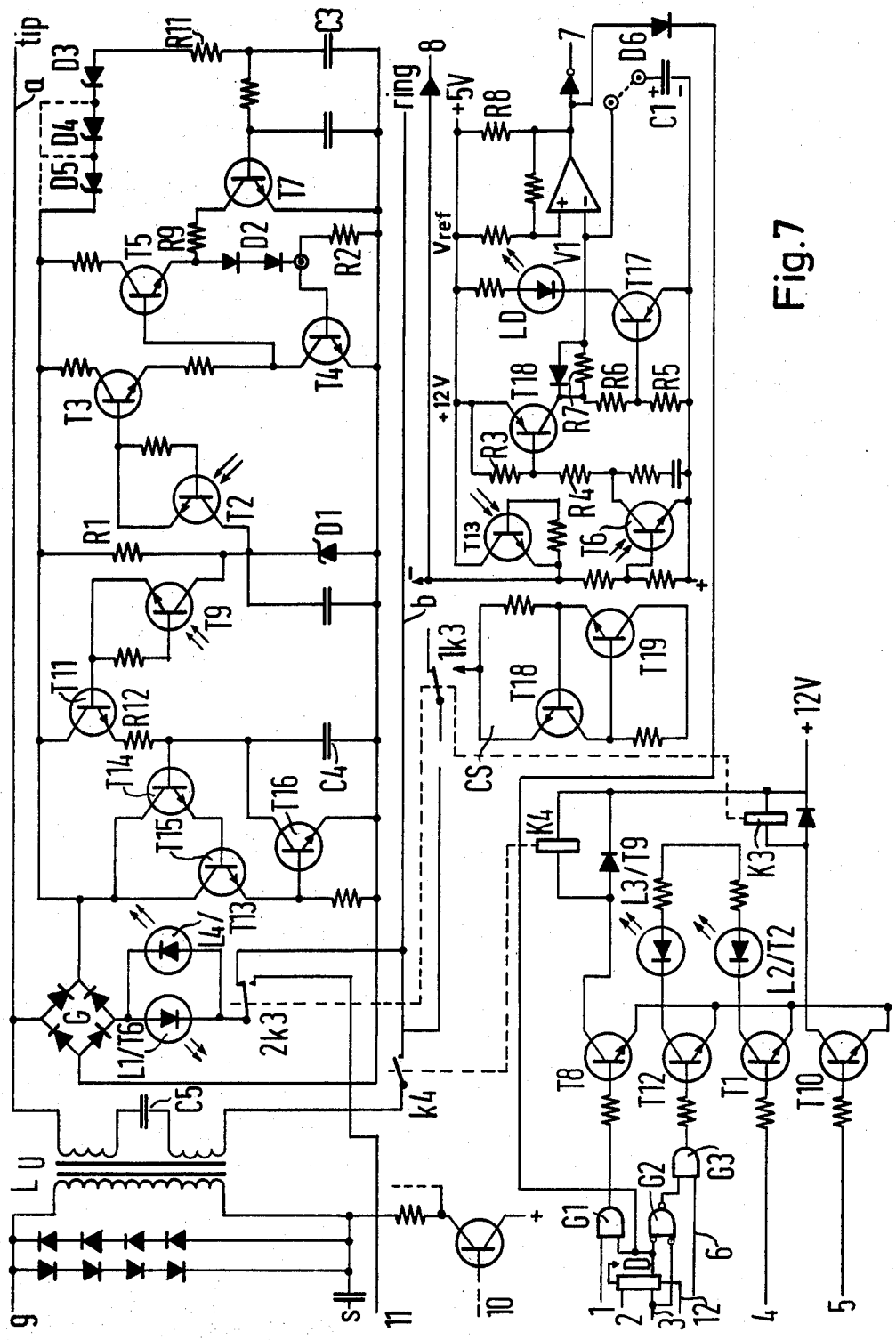
FIG. 7 is a detailed schematic diagram of a trunk line circuit (e.g., TLU) used in the FIG. 1 embodiment.

The Trunk Line Circuit (FIG. 7)

The following is a description of the functions of a trunk line circuit, such as the circuit TLU in FIG. 1. In the trunk line circuit seizure may be effected from the trunk line, i.e., from the general switched telephone network both with a "ground start" and with a "loop start".

If in the idle condition no potential whatever is applied to the tip conductor, an incoming seizure occurs by connecting ground potential ("ground start"). By connecting this ground potential in the case of an outgoing seizure, the acknowledgement signal is received from the exchange side. In the case of the "ground start", a negative potential (-48 volt) is continuously applied across the ring connector. In the case of a "loop start", ground potential is continuously applied from the exchange side to the top conductor, while -48 volt is continuously applied to the ring conductor. In such a case, seizure can only occur by transmitting an alternating current ringing signal. The processes in connection with both modes of seizures will be described hereinbelow. Since it must be possible to connect an outside repeater to general switched telephone networks with the first mode (ground start) as well as with the second mode (loop start), the trunk line circuit must always be connected in such a manner that both seizing modes are equally feasible.

In the outside repeater shown on the right-hand side, both speech wires T and R (tip and ring) are connected to the trunk line and, therefore, to the general switched telephone network while the wires shown on the left-hand side represent the address circuits, the data circuits, as well as one of the two speech wires. This speech wire is marked g. The outer wires, particularly the signaling wires 1–6, are connected to the data transmission circuit group LSB at a lower data signaling rate, namely, for the data, address and information exchange with the central data processing unit CPU. The exchange side of the outside repeater is designated as the secondary side of a transformer LU and must be suitable for any exchange-side connecting and ringing mode.

Trunk Line Circuit With Ground Start

In the idle condition, the transistor T1 is switched on via the signaling wire 4 due to the potential applied and remains energized via a conventional holding circuit not shown in detail. Upon scanning the trunk line circuit, its idle condition is recognized because of the existence of the holding circuit.

If the incoming seizure in the case of a ground start occurs through application of ground potential to the tip conductor, a loop in the trunk line circuit is activated via the ring conductor and is connected from the top connector via the bridge rectifier G, not only directly via the photo coupler L1 to the ring conductor, and via additional circuits connected in parallel in which are disposed, inter alia, a diode D1, a resistor R1 or the transistors T2-T5. The resistor R2 and a pair of diodes D2 are likewise connected in one of these additional circuits. Due to the activation of the photo coupler L1/T6, the transistor T6, which is under the influence of the photo coupler, is activated via the +12V potential and resistors R3 and R4, as well as via resistors R5, R6, R7, and the amplifier V1 and control lead 7 are then activated. Parallel circuits still exist via the capacitor C1 and the resistor R8. The trunk line circuit is indicated as occupied by the data processing unit CPU via wire 7. Transistors T1 and T6 are conductive. This is valid as an indication that a seizure with ground potential has taken place (ground start).

If an alternating current ringing signal is simultaneously transmitted from the general switched telephone network upon application of ground potential to the tip conductor, the transistor T7 in the circuit is also switched on via the resistors R9, R10, R11 and the capacitors C2, C3, as well as the diodes D3-D5. The detection of the ringing signal in the trunk line circuit is necessary, since the disconnection of the ringing signal, when the called party in the PABX answers, must be controlled by the trunk line circuit. Upon simultaneous transmission of ground potential via the tip conductor and the ringing signal, the evaluation of the ground potential for seizing purposes is likewise effected by the evaluator circuit via the photo coupler L1/T6, thereby activating transistor T6 in the manner specified hereinabove.

When the called party answers, this is detected by the data processing unit CPU upon scanning the outside repeater. When the called party answers, the transistor T8, as well as the relay K4, and activated via the wire 1 and the gate G1. Moreover, the transistor T12 has been switched on via the wire 6. As a result, the photo coupler L3/T9 is activated and thus, the transistor T9, which is connected to the resistor R12 and the capacitor C4 in bridge rectifier G, is switched on. This causes the direct current flowing through the tip and ring conductors to rise more than tenfold (e.g., from 2 mA to 26-35 mA). This dc current rise is detected in the general switched telephone network as answering, causing the ringing signal to be disconnected.

During the conversation, the above mentioned transistors T9, T2, T3, T4 and T5, as well as T1, T8 and T6 remain conductive.

To release the connection initiated by the subscriber to the general switched telephone network the potentials are turned off from the ring and tip conductors. However, the free indication occurs with a time lag so as to prevent an immediate new seizure and to first ensure an internal full release of all switching elements seized and operated. Subsequently, only the circuit is switched through via the transistor T1 to permit new seizure.

If the connection being established is an outgoing seizure from the trunk line circuit, the transistor T10 is switched on via the wire 5, and the relay K3 is activated upon detection of the off-hook condition of a calling station and concurrent detection of the idle condition of the trunk line circuit after the trunk code has been selected. The current-sink circuit CS is connected to render the ring conductor operative through contact 1k3 with the result that the current for the ring conductor rises to about 50 mA. At the same time, a potential is applied to the tip conductor by switching the transfer contact 2k3, that is, a loop is established via the photo coupler L1 (T6) and the rectifier bridge B between tip and ring conductor. If the line repeater of the general switched telephone network has detected the increase in current to the ring conductor as a seizure, ground potential will be applied to the tip conductor as an acknowledgement signal, activating the photo coupler L1/T6, so that transistor T6 is again rendered conductive. As a result of this circuit condition (i.e., conducting transistors T1, T6 and T10), a ringing tone is also transmitted to the calling party so as to indicate the seizure of the general switched telephone network. The dial signals now selected by the subscriber station of the PABX are transmitted via the wire 3 to the photo coupler L3/T9 and from there to the transistor T9, so that appropriate increases in potential corresponding to the transmitted dial signals are sent to the tip conductor. These potential increases are passed to the general switched telephone network and further evaluated there.

In the case described hereinabove, the photo coupler L1/T6 and, hence, also the transistor T6, are controlled during the transmission of the dial signals with the result that the potential applied to the wire 7 would also vary continually. However, in the present case the wire 7 must remain on a sustaining potential, and the diode D6 is provided to achieve this. With the diode D6 the drawing of continuous current at the end of each dial pulse from the input of the gate G2 coming from the wire 3 is assured. In this way, the unwanted potential change to the wire 7 is avoided.

Upon completion of the call, the connection is released, as described hereinabove.

Trunk Line Circuit With Loop Start

If, instead of the seizure of the PABX from the general switched telephone network with application of ground potential to the tip connector ("ground start"), the seizure from the telephone network is effected with a "loop start", ground potential is continuously applied to the tip conductor, in idle condition, and a negative potential to the ring conductor. The incoming seizure from the telephone network occurs exclusively through the application of signaling alternating current of the ringing signal. In this case, a current rise occurs in the circuit that detects the application of ground potential in the case of a ground start with the result that, in addition to the photo coupler L1/T6 and the transistors T2, T3, T4, T5 and T6, the transistor T7 is also switched on. The resistor R7 therefore will be lower as for the ground start condition. The increase in current caused by the ringing signal initiates with one half-wave the activation of the photo coupler L1/T6 and with the other half-wave that of the photo coupler L4/T13, alternately controlling the transistors T6 and T13. Thus, an output signal is also applied alternately to the wires 7 and 8. It should be noted that the circuit via the transistor T7 represents a controlled function for the photo coupler L1/T6, ensuring its satisfactory response.

As explained earlier, answering the subscriber of the PABX causes the photo coupler L3/T9 and the relay K4 to be activated. A speech circuit is established by means of contact K4 via the secondary winding of transformer U, and transistor T9 and hence, also T11, are switched on via photo coupler L3/T9. As described earlier, the direct current is increased more than tenfold via the speech wires. This involves the activation of the current sink. In the general switched telephone network this is detected as an answering by the called party and the ringing signal is cut off. The release occurs after establishment of the call condition, as explained above.

If seizure of the trunk line is effected from the calling party, when data processing unit CPU detects the removal of the receiver by the calling party during a scanning cycle, the signal is disconnected from the wire 4 and, instead, a potential is applied to the wire 7. This causes the transistor T12 to be switched on, thereby activating the photo coupler L3/T9 and the transistor T9. As a result, the current through the speech wires is increased, which increase is interpreted in the general switched telephone network as a seizing signal. This network does not return an acknolwedgement signal. The increase in current acts on the photo coupler L1/T6, with the result that a signal is applied to the wire 7. This is detected by the data processing unit CPU during the scanning of the outside repeater. After detection of the seizing signal in the general switched telephone network, a dial tone is sent to the PABX. As described above, the transmission of the dial signals, e.g., DC dial signals, occurs by generating current rises in the speech wires via the transistor T12 and the photo coupler L3/T9. Release follows after the connection has been established, as described above.

Figure 8:
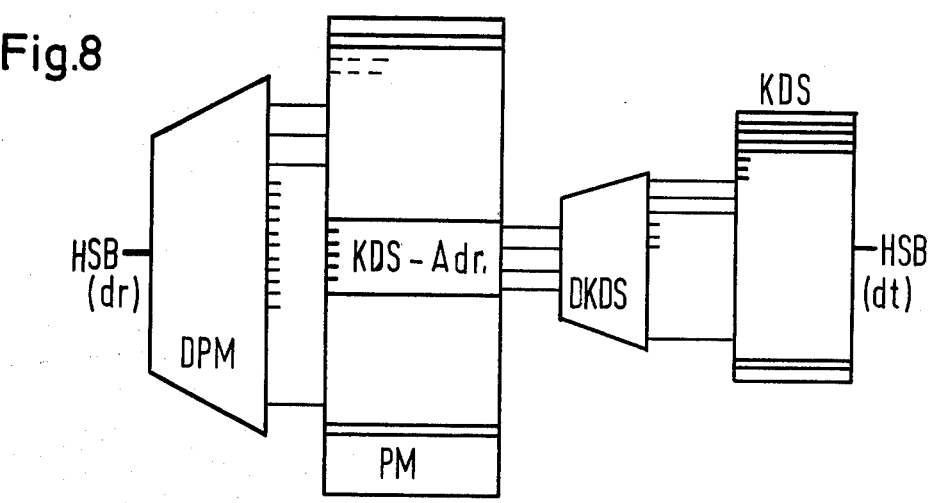
FIG. 8 is a schematic block view illustrating the connected relationship between the customer and program memories in the FIG. 1 embodiment.
Figure 9:
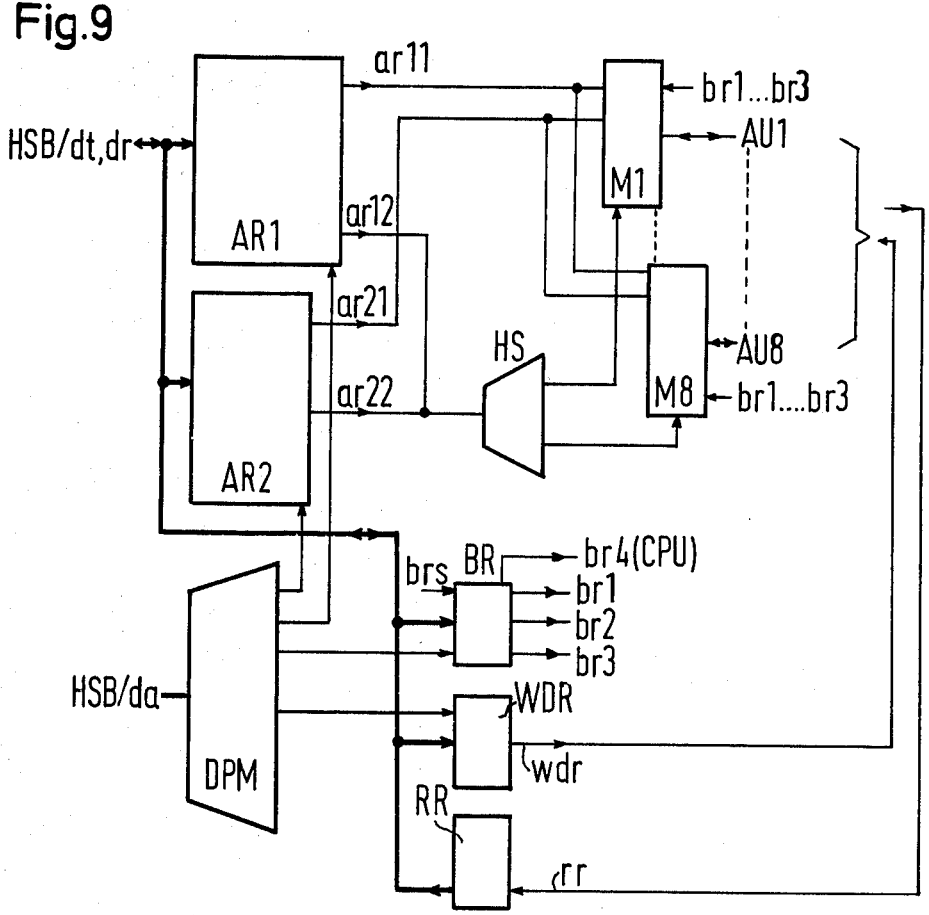
FIG. 9 is a detailed schematic block diagram of the circuitry for selecting customer memory locations for carrying out read, write and erase operations in connection with the customer memory in the FIG. 1 embodiment.

The Customer Memory CM (FIGS. 1, 8, 9)

The customer memory comprises a storage that can be altered by electrical means (e.g, an electrically alterable read only memory EAROM). New data are input to this customer memory CM from the peripheral unit of the maintenance circuit. The memory locations are selected via the existing faster bus lines HSB with the aid of available addresses which are not utilized further. Random access of the central data processing unit CPU to the customer memory (also for testing purposes) is assured by using the faster bus lines HSB. Further, by utilizing the faster bus lines, the number of addresses available for selecting storage locations is so large that data can be placed into storage and fetched in a polling process for all subscribers who can be connected to the system.

As shown in FIG. 8, customer memory CM is advantageously combined with the existing program storage PM in such a way that a certain area of the program memory PM receives a portion with higher-level customer data, that means group addresses which, like the other storage locations of the program storage PM, are selected and sampled by the central data processing unit CPU via the faster bus lines HSB and the decoder DPM. On the basis of the information available in the program memory PM, certain storage locations are selected for the purpose of fetching specific (e.g., subscriber-specific or peripheral units) individual information via an additional decoder DKDS in another smaller memory KDS. The sampling result is routed to the central data processing unit CPU via the data output lines da of the faster bus lines HSB for the further information.

The utilization of idle memory locations of the program storage PM for combination with the selection of storage locations of the customer memory has the advantage that the program memory can be loaded to full capacity, while the existing faster bus lines HSB and address repertory can be fully utilized for the selection of the customer memory. In addition, this reduces the necessary size of the customer memory to a bare minimum.

FIG. 9 shows details of the selection circuit for storage locations of the customer memory for reading, writing and erasing information therein.

By means of an address applied to the input of the decoder DPM via the address bus lines HSB/da, by that address a given storage location is selected in one of the two address buffer registers AR1 and AR2, with the result that at an output ar11 of the address register AR1 and at an output ar21 of the address buffer register AR2 a complete information block is applied to the inputs of storage devices M1-M8 dependent of the similar transmitted status and command information, which are received via the data bus lines HSB/dr in separate bit series. At the same time the information is going to the storage devices M1-M8, the storage address goes to the decoder HS to select the storage location to store, to read out or to erase the customer data assigned, for example, to a telephone station.

Parallel to the selection processes described above, storage locations in an instruction register BR, a data input register WDR and a read register RR are selected with the polling of the address register. The writing of data into or the reading of data from one of the storage devices M1-M8 (outputs AU1-AU9) occurs via the addressing by the decoder HS. These data items are transmitted via the data bus lines dr or the read line dt and rerouted. The erase, write or read instructions are a part of the transmitted information of the data processing unit CPU via the data bus line HSB/dr. This information flows by way of the instruction register BR, WDR, RR via the outputs br1, br2, br3, wdr, rr to the storage devices M1-M8. An acknowledgement signal is passed to the data processing unit CPU via an output br4 of the instruction register BR. It is ensured via an input brs that if a register module is not plugged in, the ongoing sequence of operations is not executed and that the data processing unit CPU recognizes this. The CPU will then either occupy another register and continue the operation or start with a new switching process. Signaling may occur in parallel with the foregoing operation.

For the erasing, writing and reading operations of the customer data storage KDS fast rising pulses are needed. This means that the storage capacitor SpC provided in the corresponding circuit (FIG. 10) must be charged very rapidly. Current pulses are necessary to achieve this. However, the transistors are endangered by these current pulses. To remove this risk, field effect transistors that can be turned on via a current sink must be employed.

A potential change from +5V to −23V and lasting, for example, for a period approximately equal to or exceeding 100 ms is needed as an erase signal. The permissible tolerance range is very narrow (e.g., ±5%).

Storage Arrangement for Customer Memory CM

Figure 11:
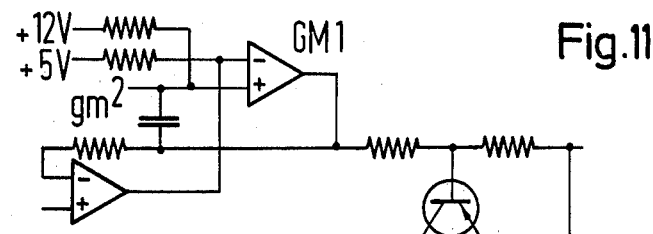
FIG. 11 is an extension of the circuitry illustrated in FIG. 10.
Figure 10:
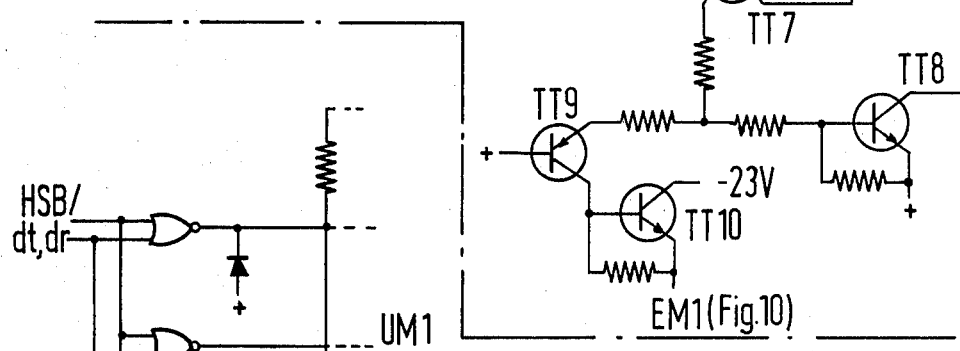
FIG. 10 is a detailed schematic diagram of apparatus for applying data signals to the storage locations M1-8 of the customer memory in the FIG. 9 embodiment.
Figure 10:
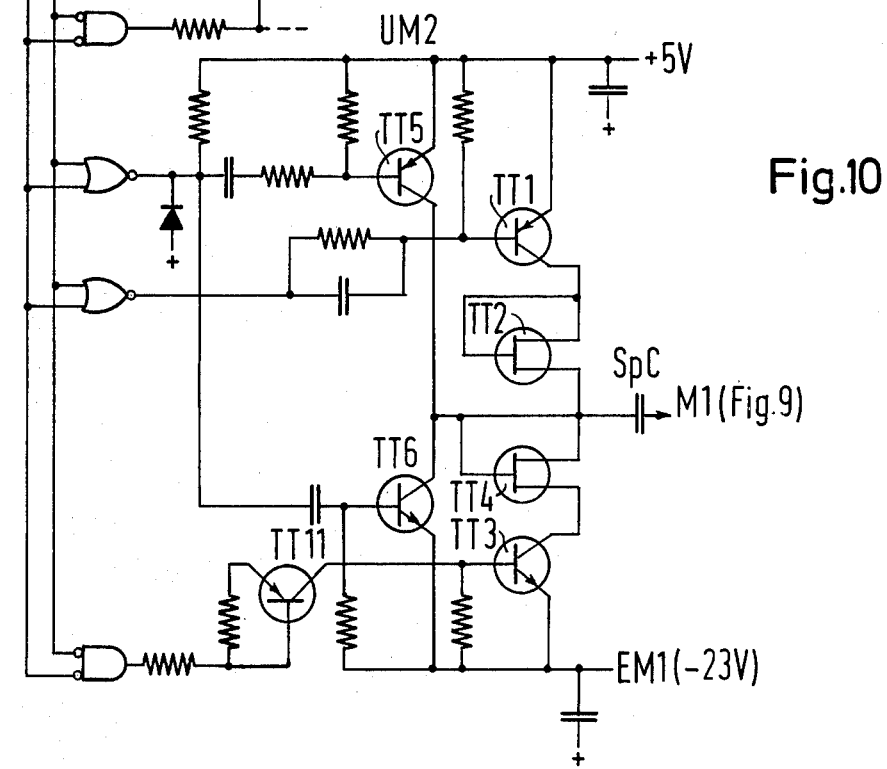

FIGS. 10, 11 show the special changeover unit for the fast loading and discharging of storage capacitor SpC. As mentioned earlier, this storage capacitor SpC is conditional upon the fast operating time of storage devices M1-M8.

The circuit shown in FIG. 11 is only to control the input information on the connecting point EM1 in FIG. 10 and FIG. 11.

Dependent on the commands for erasing, writing and reading there will be a different status on the outputs br1, br2 and br3 of the instruction register BR. For writing the output br1 will carry a sequence of 200 square waved (+) pulses. The voltage alternates between +5V and −23V. That means for a period 5 µs there is a +5V voltage and for a period of 100 µs there is a −23V voltage on the output br1. For erasing there will be an inactive status on the outputs br1, br2 and br3. For reading, there will be an on pulse. The voltage alternates one time from +5V to −14V (a period of 1 µs) and back to 5V. Dependent on information from the central processing unit CPU transmitted via the faster data bus line HSB/dr, the capacitor SpC must be charged and discharged dependent on the information flowing to the storage devices M1-M8. This charging and discharging will be allowed by changing the voltage on the connecting point EM1 by the reading, writing and erasing commands.

In the circuit in FIG. 10 the transistors TT5 and TT6 turn on faster than the transistors TT1 and TT3.

The field effect transistors TT2 and TT4 only work as current sinks to get a limited current on the transistors TT1 and TT3, to protect them from short circuit and they are always in an on state.

If −23V is applied to the point EM1, the capacitor C2 will be charged, and if it is charged the transistor TT6 is turned on for the 100 µs period that the −23V is connected.

Then the transistor TT5 will be turned off, as will the transistor TT1, but slower. If the transistor TT1 is turned off the transistor TT3 is turned on, and the capacitor SpC is loaded.

These operations are done very fast. After the −23V is turned off of EM1, the +5V voltage is turned on for a period of 5 μs. The transistor TT5 is turned on. The transistor TT6 is turned off. The transistor TT1 is turned on and the transistor TT3 is turned off. The time during which the transistor TT3 is not already turned off the field effect transistor TT4 protects the transistor TT3.

The capacitor SpC is discharged. These operations are repeated as often as the voltage on EM1 is changed.

Allocation of the Scanning Cycle

Figure 12:
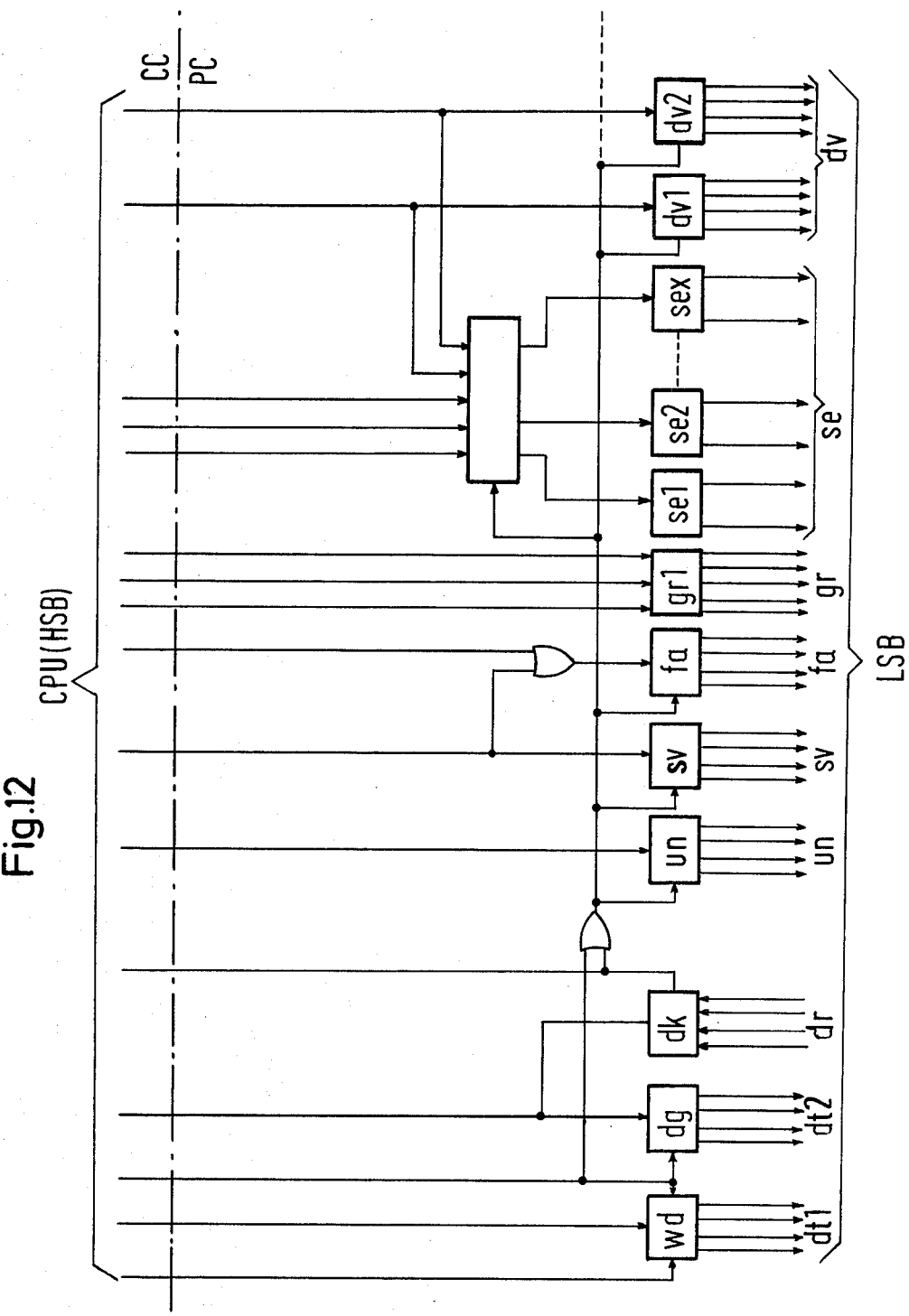
FIG. 12 is a detailed schematic diagram of the peripheral conversion and storage device (PC) in the FIG. 1 embodiment and of its connection to the faster rise time pulse transmitting bus line group (HSB) and the lower rise time pulse transmitting bus line group (LSB) therein.

FIG. 12 shows the peripheral conversion and storage unit PC (FIG. 1) which is to act as a connecting link between the faster bus line HSB and the slower peripheral bus line LSB. Each of the two data transmission line groups can be subdivided depending on the purpose. They are, first, recording circuits dt1 over which is transferred the information fetched from specified peripheral units and to be stored in the common control unit CC, e.g., in connection with the charge registration or routine testing. Second, there are outgoing and incoming data circuits dt2 or dr, over which the instructions are transferred in the outgoing direction to the peripheral units and subscribers and, conversely, the data transmitted from there.

Third, they are the circuits un and sv over which the peripheral units and subscribers must be scanned in successive cycles from the common control unit CC and, thus, from the central data processing unit relative to its instantaneous condition.

Fourth, various trunk groups are provided for scanning the peripheral units, over which trunk groups the particular circuit conditions of peripheral units are interrogated for performing switching processes about to be executed, such as call establishment or changeover (e.g., in the case of a consultation or transfer call).

It should be noted that the bus lines communicating with the central control have as many wires as are needed for transmitting the parallel binary code being used. If, for example, 256 addresses are needed, there will be 8 wires for carrying 8 parallel bits.

To utilize the address repertory as effectively as possible, the unit must be so selected that it is assigned a group address, an area address and, within the area, a unit address, for example, in order to identify the holding circuit group, the area within the group, and the repeaters themselves. FIG. 12 shows the corresponding address bus lines gr, se and dv.

A periodically completed scanning cycle lasts 12.5 milliseconds, if each peripheral unit is scanned 80 times per second, as mentioned hereinabove. Since only 1 millisecond is needed for transmitting the data to be sampled, the remaining time of 11.5 milliseconds within the scanning cycle is available for other purposes.

For the reasons set forth above, there are provided, in addition to the universal scanning circuits un and sc for the periodic scanning of the telephone stations, repeaters of every kind (e.g., J1-Jm), tone generators (e.g., TG1-TGx), connecting circuits ALC for attendant's stations, voice-frequency signaling receivers R-Tf, etc. There are further provided for the scanning of units assigned to a special testing position for associated units in case of need or also as a matter of routine, special lines fa that permit a more rapid scanning of specified peripheral units.

More important than the above additional scanning is the fact that in the available time of 11.5 milliseconds per period of the remaining cycle, telephone stations, units and circuits are polled by means of the central processing unit CPU. Thus, the central processing unit CPU gains access to these peripheral units so as to be able to handle instructions and information for processing sequences of operations waiting to be switched. If 11.5 milliseconds are not adequate for such operations, the incomplete switching process and associated polling of the peripheral equipment are continued within the following free time in the sequence period of the scanning cycle after completion of the normal scanning of the peripheral equipment.

The idle times in each period in the scanning cycle are also utilized for other purposes, for example, as mentioned above, to poll storage locations in the customer data storage for the purpose of establishing a connection, i.e., for reading customer-specific data necessary for the call setup simultaneously with the selection of a peripheral unit involved in the call (e.g., link control circuit or interexchange line repeater), depending on the particular call condition.

If data in the customer memory must be erased and written anew, if certain routine test procedures must be performed according to a prespecified program, or if maintenance operations must be controlled externally, certain units of the system, as well as the test panel involved or the maintenance circuit, must also be polled. This is normally done during low-traffic periods in the remaining idle periods of the scan cycle. Processes not performed during an idle period of the cycle are performed in the next idle period of a subsequent scan cycle.

In the example under discussion, erasing and new writing of data in the customer data storage, as well as control of testing procedures, take place from the maintenance. To accomplish this, the data exchange with the common control unit occurs only via the faster bus lines. The maintenance processes are also controlled via the maintenance circuit MC.

The ringing signal generator RG for the subscriber stations supplies the maintenance circuit with the clock pulses necessary for routine tests. The ringing signal generator is powerline-operated via the line SVS.

The maintenance circuit exchanges data via the slower (LSB) and the faster (HSB) bus lines.

Attendant's Station AC - Attendant's Connecting Circuit ALC

Figure 13:
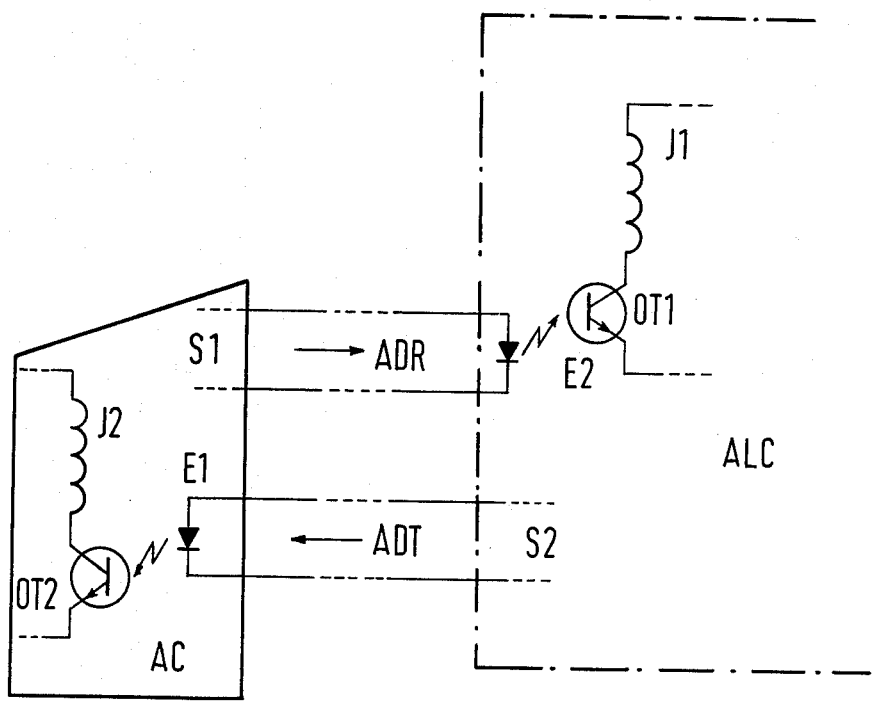
FIG. 13 is a detailed schematic view of the attendant's station (AC) and connecting circuitry (ALC) in the FIG. 1 embodiment.

FIG. 13 shows the circuitry for the transmission of every type of information to the attendant's station and from there to the connecting circuit ALC using a minimum number of transmission lines. To accomplish this, the signals to be transmitted are sent as serial-code dc signals. FIG. 13 shows the transmitter of the attendant station marked S1. This transmitter applies the coded signals to the transmission path ADR. These signals consist of potential connections and disconnections of various durations. The same is true for the transmission in the opposite direction by the transmitter S2 via the transmission path ADT.

The reception of the transmitted signals and, thus, the transmission to the evaluator means, not shown, at the receiving end occur via the corresponding photo couplers OT1 or OT2. Thus, the provision of each attendant station with only 1 speech wire pair and 4 signal transmission wires is assured.

The principles of the invention are described hereinabove by describing the construction and operation of a system constructed accordingly. The described system is, however, to be considered only as being exemplary of those principles. A number of modifications to or changes in the described system will appear obvious to those skilled in the art, but it is to be remembered that the invention is defined by the appended claim. Thus, such modifications or changes will be within the ambit of the invention as defined by the claim.

We claim:

1. In an electronic telephone switching system having peripheral units including a plurality of trunk and tie line circuits, at least one attendant line circuit, a plurality of signaling tone receivers and a plurality of link control circuits, having a plurality of tone generators, having speech path and tone switching matrices for interconnecting said peripheral units and for connecting said tone generators to a through-connection between ones of said peripheral units, having a central control means constituted by a plurality of components including a central processing unit, program memory, customer memory and a scratch pad memory, having system timing means, and having bus lines interconnecting the components of said central control means for transmitting information pulses therebetween and other bus lines connecting said peripheral units to said central control means, the improvement comprising:

said speech path and said tone switching matrices being formed as one-wire switching matrices, a plurality of electronic crosspoint switch means, a switch means being located at each crosspoint of said switching matrices, each said switch means having a conducting path terminated by first and second terminals and a control terminal for controlling the state of conduction of said conducting path, said first and control terminals of said switch means in each coordinate in a first direction of said speech path matrix being connected in parallel to said link circuit, said second terminals of said speech path matrix switch means being connected, respectively, to coordinates in a second direction thereof, said first and control terminals of said switch means in each second direction coordinates of said tone matrix being connected in parallel to a said tone generator, said second terminals of said tone matrix switch means being connected, respectively, to first direction coordinates therein, said tone matrix first direction coordinates being coupled, respectively, to said first direction coordinates of said speech path matrix to which said first terminals of said speech path matrix are connected, means for polling different ones of said peripheral units and of said link control circuits for defining the coordinates of given crosspoints in the speech path and tone matrices.

2. The improved electronic telephone switching defined in claim 1 wherein said central control means includes means for controlling scanning and polling of said peripheral units in different time periods of a scanning cycle, upon limitation of a scanning cycle, said scanning and polling being performed in the same time period of the scanning cycle.

3. The improved electronic telephone switching system defined in claim 1 further comprising:

means for rapidly scanning said peripheral units under the control of said timing means and for making predetermined ones of said peripheral units in said scratch pad memory, the marked peripheral units being indicated as succeeding program steps in said program memory, means for polling said marked peripheral units in remaining free time periods following scanning and test, maintenance and customer change panels connected to be polled by said polling means in remaining free time periods.

4. In an electronic telephone switching system having peripheral units including a plurality of trunk and tie line circuits, attendant stations connected to at least one attendant line circuit, a plurality of signaling tone receivers and a plurality of link control circuits, having a plurality of tone generators, having speech path and tone switching matrices for interconnecting said peripheral units and for connecting said tone generators to a through-connection between ones of said peripheral units, having central control means constituted by a plurality of components including a central processing unit, program memory, customer memory and a scratch pad memory. having system timing means and having bus lines interconnecting the components of said central control and other bus lines connecting said peripheral units to said other bus lines, the improvement comprising:

two wire sending and two wire receiving connections extending, respectively, between said attendant line circuit and said attendant station, photo coupling means in the receiving portion of each said two wire connection for controlling that receiving means.

* * * * *